United States Patent Office 3,346,596
Patented Oct. 10, 1967

3,346,596
TRICYCLIC KETAL COMPOUNDS HAVING BIOLOGICAL ACTIVITY
Paul E. Hoch, Youngstown, and George B. Stratton, Lewiston, N.Y., assignors to Hooker Chemical Corporation, Niagara Falls, N.Y., a corporation of New York
No Drawing. Filed Nov. 25, 1964, Ser. No. 413,947
16 Claims. (Cl. 260—346.1)

This application is a continuation-in-part of co-pending application Ser. No. 327,519, filed Dec. 2, 1963.

This invention relates to new compositions of matter and to processes for their preparation. More specifically, the invention relates to novel cyclic ketal compositions, a novel cyclization reaction for production of such compounds, and methods for utilizing the compositions in the control of pests, the regulation of plant growth, and other biological methods, and as chemical intermediates.

In accordance with this invention, there are provided compounds having the formula:

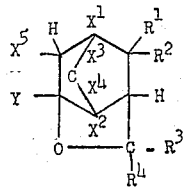

wherein
$X^1$ and $X^2$ are independently selected from the group consisting of hydrogen, halogen, alkyl, alkenyl, halogenated alkyl and halogenated alkenyl;
$X^3$ and $X^4$ are independently selected from the group consisting of hydrogen, halogen, alkoxy, alkyl, alkenyl, halogenated alkyl, and halogenated alkenyl, at least two of $X^1$, $X^2$, $X^3$ and $X^4$ being halogen;
$X^5$ is selected from the group consisting of hydrogen, halogen, and alkoxy;
Y is a nucleophilic radical;
$R^1$ and $R^2$ are independently selected from the group consisting of hydrogen, hydrocarbyl, halogen-substituted hydrocarbyl, and carboxy;
$R^3$ and $R^4$ are independently selected from the group consisting of hydrogen, hydrocarbyl, halogen-substituted hydrocarbyl, hydroxy-substituted alkyl, alkoxy-substituted alkyl, and hydroxy-substituted alkoxy-alkyl; and
$R^1$ and $R^3$ can join to form a cycloalkyl group; provided that at least one of $R^1$ and $R^2$ can be hydroxy-substituted alkyl when Y is one of halogen, hydroxy, hydrocarbyloxy, mercapto, substituted hydrocarbyloxy and substituted hydrocarbyl mercapto.

The hydrocarbyl radicals are monovalent radicals derivable from a hydrocarbon by the removal of one hydrogen atom. Typical hydrocarbyl radicals are alkyl, alkenyl, aryl, cycloalkyl and the like, defined with greater particularity herein.

Illustrative examples of the alkyl substituents, which usually contain from 1 to about 18 carbon atoms, and preferably from 1 to about 6 carbon atoms, are methyl, ethyl, propyl, isopropyl, butyl, isobutyl, amyl, hexyl, cyclohexyl, heptyl, octyl, nonyl, dodecyl, pentadecyl, stearyl, octadecyl, and the like, said alkyl group being a monovalent radical derivable from an aliphatic hydrocarbon by the removal of one hydrogen atom. The alkylene radicals can be similarly described, except that they are divalent radicals derivable from an aliphatic hydrocarbon by the removal of two hydrogen atoms, such as methylene, ethylene, and the like. The alkyl radical can be substituted by halogen, such as chlorine, bromine, or fluorine, as in chloromethyl, dichloromethyl, trichloromethyl, trifluoromethyl, bromomethyl, chloroethyl, fluoropropyl, hexachloroisopropyl, chlorobutyl, bromobutyl, chlorocyclohexyl, chloropropyl, bromooctyl, chlorooctyl, chlorodecyl, chlorododecyl, bromododecyl, bromopentadecyl, and the like.

Among the alkenyl substituents which usually contain from 1 to about 18 carbon atoms, and preferably from 1 to about 6 carbon atoms, are vinyl, allyl, butenyl, hexenyl, octenyl, dodecenyl, and the like, said alkenyl group being a radical derivable from an alkene by the removal of one hydrogen atom. The alkenyl radical can be substituted by halogen, such as chlorine, bromine or fluorine, as in trichlorovinyl, 2-chloroallyl, 2,3-difluorobutenyl, 2,3-dichlorododecenyl, 2-bromoallyl, and the like.

Typical aryl substituents, including aralkyl and alkaryl groups, which usually contain from 6 to about 10 carbon atoms, are phenyl, benzyl, tolyl, phenylethyl, xylyl, naphthyl, hexylphenyl, and the like, said aryl group being a monovalent radical derivable from an aromatic hydrocarbon by the removal of one hydrogen atom. The aryl radicals can be substituted by halogen, such as chlorine, bromine, and fluorine, as in p-chlorophenyl, p-bromophenyl, p-fluorophenyl, and the like.

Typical cycloalkyl substituents, which usually contain from three to about twelve carbon atoms, are cyclohexyl, cyclopropyl, cyclopentyl, cycloheptyl, cyclooctyl, and the like, said cycloalkyl group being a monovalent radical derivable from an alicyclic hydrocarbon by the removal of one hydrogen atom. The cycloalkyl radicals can be substituted by halogen, e.g., chlorine, bromine, and fluorine, as in chlorocyclohexyl, bromocyclopentyl, fluorocyclohexyl, and the like.

The substituting halogen atoms which are useful include chlorine, bromine, and fluorine. The halogenated alkyl, aryl, cycloalkyl or alkenyl radicals can bear from one up to a number, corresponding to perhalogenation, i.e., all hydrogens replaced with halogen atoms.

Typical nucleophilic radicals, as the term is employed herein, are halogen, hydroxy, hydrocarbyloxy, mercapto, cyano, thiocyano, carboxy, azido, hydrocarbylmercapto, hydroxy-substituted hydrocarbyloxy, hydroxy-substituted hydrocarbylmercapto, mercapto-substituted hydrocarbyloxy, mercapto-substituted hydrocarbylmercapto, hydrocarbyloxy-substituted hydrocarbyloxy, hydrocarbyloxy-substituted hydrocarbylmercapto, hydrocarbylthiohydrocarbylmercapto, and hydrocarbylthio-hydrocarbyloxy, wherein the hydrocarbyl groups are as defined hereinbefore, and can be halogen-substituted, as desired.

The preferred compounds of the invention are those wherein the halogen substituents are chlorine or bromine, and in which $R^1$ and $R^3$ are hydrogen, $R^2$ is selected from hydrogen, chloro-substituted lower alkyl, hydroxy-substituted lower alkyl, and carboxy; and $R^4$ is selected from hydrogen, chloro-substituted lower alkyl and lower alkoxy-substituted lower alkyl. Even more preferred are such compounds wherein the halogen is chlorine. The preferred nucleophilic radicals are chlorine, alkoxy, aryloxy, hydroxy, cyano, carboxy and hydroxy-substituted alkoxy. Lower alkyl radicals have one to six carbon atoms.

The compounds of the invention are prepared in a series of reactions starting with selected bicyclic alcohols. These alcohols are prepared by reacting the appropriate substituted cyclopentadiene and unsaturated alcohol as represented by the following equation.

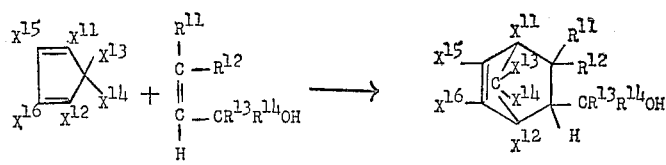

wherein $X^{11}$ and $X^{12}$ are independnetly selected from the group consisting of hydrogen, halogen, alkyl and alkenyl;

$X^{13}$ and $X^{14}$ are independently selected from the group consisting of hydrogen, halogen, alkoxy, alkyl, and alkenyl, at least two of $X^{11}$, $X^{12}$, $X^{13}$ and $X^{14}$ being halogen;

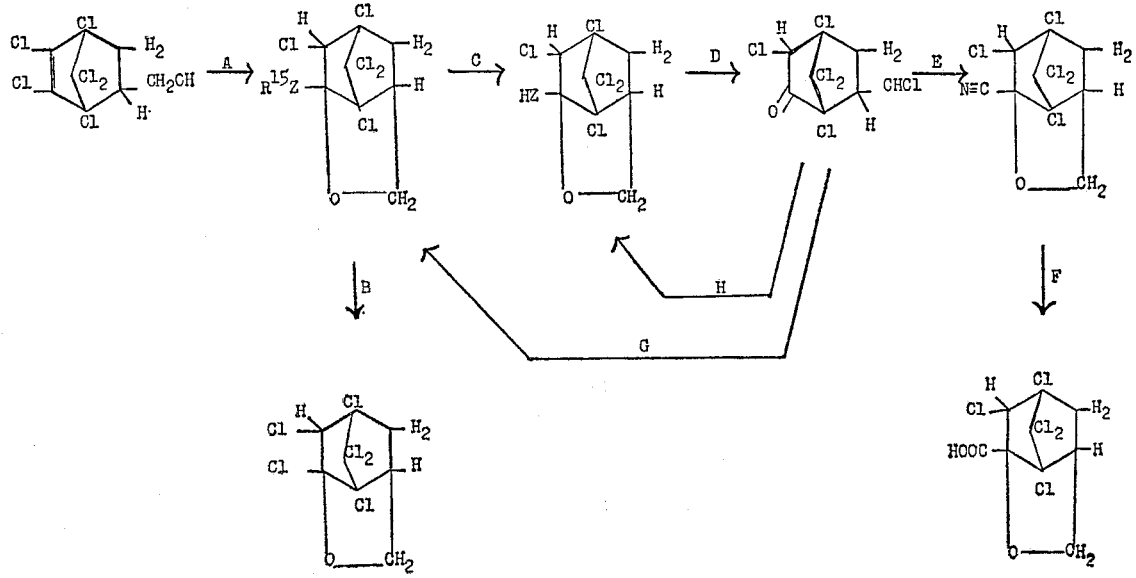

$X^{15}$ and $X^{16}$ are independently selected from the group consisting of hydrogen, halogen and alkoxy, at least one of $X^{15}$ and $X^{16}$ being halogen;

$R^{11}$ and $R^{12}$ are independently selected from the group consisting of hydrogen, hydrocarbyl, and hydroxy-substituted alkyl;

$R^{13}$ and $R^{14}$ are independently selected from the group consisting of hydrogen, hydrocarbyl, hydroxy-substituted alkyl, alkoxy-substituted alkyl and hydroxy-substituted alkoxyalkyl; and $R^{11}$ and $R^{13}$ can join to form a cycloalkyl group, generally of 5 to 6 carbon atoms.

The halogen, hydrocarbyl, alkyl, and alkenyl radicals are the same as those described hereinbefore. The preparation of such alcohols is described in detail in U.S. Patent 3,007,958. Suitable cyclopentadiene include, for example, 1,2,3,4,5,5-hexachlorocyclopentadiene;
1,2,3,4,5-pentachlorocyclopentadiene;
1,2,4,5,5-pentachlorocyclopentadiene;
tetrachlorocyclopentadiene;
1,2,3,4-tetrachloro-5,5-dibromocyclopentadiene;
1,2,3,4-tetrachloro-5,5-difluorocyclopentadiene;
1,2,3,4-tetrachloro-5,5-dimethoxycyclopentadiene;
1,3,4-trichloro-2,5,5-trimethoxycyclopentadiene;
trichloromethylpentachlorocyclopentadiene;
trichlorovinylpentachlorocyclopentadiene;
butenylpentachlorocyclopentadiene;

and the like. The usual halogen substituents are chlorine, fluorine, bromine and mixtures thereof, preferably chlorine. Suitable alcohols are, for example, 2-butenyl alcohol; cinnamyl alcohol; 1-carboxy-3-hydroxy propene-1; 2-butene-1,4-diol; 3-hexene-2,5-diol; 8-hexadecene-7,10-diol; 1,4 - cyclohexyl-2-butene-1,4-diol; 3,4-dihydroxy-2-butene; 3-hydroxycyclopentene-1; 3-hydroxycyclohexene-1, and the like. Compounds that are readily convertible to alcohols in the reaction process are also useful, such as 3,4-epoxy-1-butene and 3,4-epoxy-1-hexane.

The preparation of the compounds of the invention is illustrated by the following equations wherein the reaction steps are designated by the letters A through H, but is not intended to be limited thereby.

In the reaction designated on the chart by A, the bicyclic alcohol is contacted with a strong base in an alcohol or an aqueous alcoholic medium. The strong base is one that is capable of forming an alkoxide with the alcohol medium, such as an alkali metal hydroxide or an alkali metal itself. Suitable alkali reactants are sodium, potassium, lithium, rubidium, cesium, and the corresponding hydroxides, such as sodium hydroxide and potassium hydroxide, and the like. If desired, the alkoxide reactant can be prepared prior to its addition to the bicyclic alcohol by reacting the alkali compound with the appropriate alcoholic component. Suitable alcohols or like media for use in forming the alkoxide, or as the alcoholic medium for the reaction, are those having the formula $R^{15}ZH$, wherein Z is selected from the group consisting of oxygen and sulfur, and $R^{15}$ is selected from the group consisting of hydrocarbyl, halogen-substituted aryl, hydroxy-substituted hydrocarbyl, mercapto-substituted hydrocarbyl, hydrocarbyloxy-substituted hydrocarbyl, and hydrocarbylthio-substituted hydrocarbyl. The hydrocarbyl, and halogen-substituted aryl groups are the same as those described hereinbefore in connection with $R^1$, $R^2$, $R^3$, $R^4$.

As indicated herein, the alcoholic component can be a monohydric alcohol, such as ethanol, a polyhydric alcohol, such as ethylene glycol and glycerol, a mercaptan, such as ethyl mercaptan, a polythiol, such as β-mercaptoethanol, or can bear a combination of hydroxyl and mercapto groups. The alkali reactant is employed in an amount sufficient to provide at least three moles of alkali or alkoxide per mole of bicyclic alcohol, and preferably about four moles per mole are employed. A greater amount can be employed, if desired, for example up to ten moles per mole. A minimum of at least three moles of alcoholic component is employed per mole of bicyclic alcohol, but more usually a large excess, for example, up to 100 moles per mole, is employed to supply a solvent for the reaction. Other solvents can also be employed, such as inert diluents that do not participate in the reaction, but which are solvents for the bicyclic alcohol. Such diluents are dimethylsulfoxide, tertiary amines, such as N-methyl morpholine, and the like.

In carrying out Reaction A, the reaction mixture is generally heated to about the reflux temperature, so that the temperature is somewhat dependent on the boiling point of the alcoholic medium. However, the reaction temperature is generally in the range of about 25 to 150 degrees centigrade. The reaction time can be varied over a considerable extent, but will generally be in the range of one to ten hours. At the completion of the reaction, the reaction mixture is acidified with a mineral acid, such as hydrochloric acid, and can be diluted with water, or if desired, these steps can be reversed. The reaction mixture is ordinarily filtered to remove inorganic salts, and any excess solvent can be removed from the reaction mixture by distillation. The product of the reaction can be purified by crystallization, washing, and drying or other suitable methods.

The products of Reaction A can be reacted with halogens and halogen halides to produce compounds wherein the hydrocarbyl, e.g., alkyl, cycloalkyl, alkenyl and aryl substituents as represented by $X^{11}$, $X^{12}$, $X^{13}$, $X^{14}$, $R^{11}$, $R^{12}$, $R^{13}$, $R^{14}$ and $R^{15}$ are converted to the corresponding halogen-substituted radicals as represented by $X^1$, $X^2$, $X^3$, $X^4$, $R^1$, $R^2$, $R^3$, $R^4$ and $R^5$, respectively. $R^5$ represents the same radicals as $R^{15}$ and, in addition, halogen-substituted alkyl and halogen-substituted cycloalkyl. The halogen-substituted alkyl, alkenyl, cycloalkyl and aryl radicals are as described hereinbefore.

In Reaction B, the tricyclic ketal product of Reaction A is reacted with chlorine. The reaction is preferably carried out using chlorine gas as the reactant in the presence of a reaction solvent or diluent, such as a chlorocarbon, e.g., carbon tetrachloride, trichloroethane, trichloroethylene, perchloroethylene, and the like. The chlorination reaction can be carried out in the presence of ultraviolet light or with the aid of a peroxide catalyst, such as hydrogen peroxide or an organic peroxide, such as benzoyl peroxide, acetyl peroxide, butyryl peroxide, toluyl peroxide, cumyl peroxide, peracetic acid, perbenzoic acid, and the like. The catalyst can be added at the beginning of the reaction or in portions during the process. It can be introduced directly into the reaction mixture or together with the chlorine reactant. The quantity of catalyst is not critical since the reaction will proceed without the aid of a catalyst, but the preferred range of catalyst concentration is from about 0.1 to about 5 weight percent of the cyclic reactant. Reaction temperature is preferably in the range of about 30 to about 100 degrees centigrade, and the reaction time can vary from 2 to 20 hours or longer periods of time.

Reaction C is generally carried out by suspending the tricyclic ketal product of Reaction A in a solution of a mineral acid, such as sulfuric acid, phosphoric acid, hydrogen bromide, hydrogen iodide, hydrochloric acid (in a miscible solvent such as acetic acid), and metal chlorides, such as aluminum chloride, zinc chloride, and the like. The concentrated acid solutions are preferably employed. At least about two moles of acid are used per mole of tricyclic ketal, but more usually a large excess, for example, up to 100 moles per mole is employed to provide a solvent for the reaction. An inert solvent or co-solvent can also be employed. The reaction temperature is generally in the range of 50 to 100 degrees centigrade, or up to the reflux temperature of the reaction mixture. The reaction is facilitated by agitation and the reaction time can vary from a few minutes up to five hours, but preferably is in the range of ten to sixty minutes, more preferably ten to thirty minutes. After the completion of the reaction, the reaction mixture is cooled and filtered to recover the product. The resulting product can be purified by recrystallization, washing, drying, and other suitable methods.

In Reaction C, if the tricyclic ketal starting material has an $R^{12}$ substituent that is hydroxyl-substituted (as produced in a series of reactions beginning with a bicyclic diol), somewhat milder reaction conditions are employed in accordance with the invention to inhibit the formation of a tricyclic ketone rather than the indicated product of Reaction C. Under these circumstances, the reaction temperature is maintained in the range of 50 to 100 degrees centigrade for ten to thirty minutes, and ten to fifteen minutes at 80 to 100 degrees centigrade.

Reaction D is generally conducted by reacting the tricyclic hemi-ketal product of Reaction C with a phosphorus halide, such as phosphorus pentachloride or phosphorus pentabromide. At least about one mole of phosphorus halide is employed per mole of hemi-ketal, but an excess can be employed if desired, for example, up to ten moles per mole. A solvent can be employed for the process. The hemi-ketal compound starting material is mixed with the phosphorus pentahalide and heated slowly with agitation. The reaction is exothermic and evolves the hydrogen halide gas. After the initial mixing step, the reaction mixture is ordinarily heated at the reflux temperature, or generally in the temperature range of 100 to 150 degrees centigrade for a period of about one to five hours. The reaction product is hydrolyzed by contacting with at least one mole of water per mole of product, although a large excess of water is generally employed. Thereafter, the product can be purified by recrystallization, washing, drying, and other suitable methods. The bicyclic ketone product of Reaction D is disclosed and claimed in co-pending application S.N. 413,952, filed on even date herewith.

The bicyclic ketone product of Reaction D is capable of a number of reactions. Hence, the ketone product can be reacted with an alkoxide of the type described hereinbefore to re-form the ketal product (Reaction G) which bears an $R^{15}Z$ radical. Also, the bicyclic ketone can be reacted with an alkali metal bicarbonate, such as sodium bicarbonate, to form the hemi-ketal product having an hydroxyl radical (Reaction H). The latter reaction is preferably carried out by contacting a mixture of the bicyclic ketone, the desired alkali metal bicarbonate, water, and an alcohol diluent of the formula $R^{15}ZH$ described hereinbefore. The mixture is heated, preferably at the reflux temperature, although temperatures in the range of 50 to 150 degrees centigrade can be used. The reaction time can vary from as little as an hour up to ten to fifteen hours. After the completion of the reaction, the alcohol diluent can be removed by distillation, and the product can be purified by phase separation, washing, drying, and other suitable methods.

In Reaction E, the bicyclic ketone product of Reaction D is contacted with an alkali metal cyanide, such as sodium cyanide, potassium cyanide, or the cyanides of the other alkali metals, e.g., lithium, rubidium, and cesium. At least one mole of cyanide is generally employed per mole of bicyclic ketone, but an excess, up to ten moles per mole can be employed. The reaction is generally carried out by adding the alkali metal cyanide to a solution of the bicyclic ketone starting material dissolved in an alcoholic compound of the formula $R^{15}ZH$ described hereinbefore. The reaction mixture is heated to an elevated temperature, generally in the range of about 50 to 150 degrees centigrade, preferably at about the reflux temperature of the mixture, for a period of one to ten hours. The resulting reaction acid, hydrochloric acid, and the like. The reaction diluent can be removed by distillation, and the resulting product can be purified by crystallization, washing, extraction, drying, and other suitable methods.

The reaction conditions set forth for Reaction E can also be employed with other nucleophilic reactants, such as alkali metal thiocyanates, e.g., potassium thiocyanate;

and alkali metal azides, e.g., sodium azide, to provide products having the corresponding nucleophilic radical attached to the bicyclic nucleus.

In Reaction F, the tricyclic nitrile product of Reaction E is reacted with a strong mineral acid, such as sulfuric acid, phosphoric acid, hydrobromic acid, hydroiodic acid, and hydrochloric acid; sulfonic acids, such as toluene sulfonic acid and alkyl sulfonic acids, and the like, to replace the CN radical with a carboxyl group. The reaction can be carried out in an organic solvent medium, such as acetic acid, formic acid, and similar inert media that are not reactive in the reaction system. The reaction involves hydrolysis. Therefore, at least one mole of water should be present per mole of cyano compound, and the reaction medium should be sufficiently acidic to cause attack of the cyano radical. The reaction mixture is generally heated to a temperature in the range of about 100 to about 150 degrees centigrade, preferably at about the reflux temperature of the mixture, and the reaction is continued for about two to about fifteen to twenty hours. The desired product can be removed from the reaction mixture by filtration, and can be purified by washing, drying, recrystallization, and other suitable methods.

The products of Reactions E and F and analogous reactions can be reacted with the halogens and halogen halides to produce compounds wherein the hydrocarbyl, e.g., alkyl, cycloalky, alkenyl and aryl substituents as presented by $X^{11}$, $X^{12}$, $X^{13}$, $X^{14}$, $R^{11}$, $R^{12}$, $R^{13}$, $R^{14}$ and $R^{15}$ are converted to the corresponding halogen-substituted radicals as represented by $X^1$, $X^2$, $X^3$, $X^4$, $R^1$, $R^2$, $R^3$, $R^4$ and $R^5$, respectively. The halogen-substituted alkyl, cycloalkyl, aryl and alkenyl radicals are as described hereinbefore.

The following examples illustrate the invention, but are not intended to limit it. All parts are by weight, all analyses are given in percentages by weight, and temperatures are given in degrees centigrade, unless indicated otherwise.

EXAMPLE 1

*Preparation of 9 - hydroxymethyl - 4-methoxy-5,6,7,7,8-pentachloro-3-oxatricyclo [4.2.1.0$^{4,8}$]nonane (Reaction A)*

A solution of 400 parts of sodium hydroxide in 2500 parts of methyl alcohol was heated to reflux with stirring, and 800 parts of 2,3-di(hydroxymethyl)-1,4,5,6,7,7-hexachlorobicyclo(2.2.1)-5-heptene (the Diels-Alder adduct of cis-2-butene-1,4-diol and hexachlorocyclopentadiene) were added over a two hour period. The suspension was refluxed and stirred for an additional two hours. Then, two-thirds of the methanol was permitted to distill off. The remaining slurry was poured into three volumes of water, causing the inorganic salts to dissolve and the organic product to precipitate. The product was filtered, washed with water, and dried in an oven to obtain a substantially theoretical yield of the crude product having elemental anlysis and spectroscopic properties for

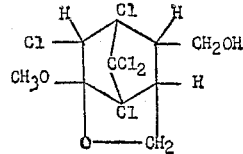

Recrystallization of this crude product from hot carbon tetrachloride yielded a pure product with a melting point of 157 to 158 degrees centigrade.

EXAMPLE 2

*Preparation of 4 - ethoxy-9-hydroxymethyl-5,6,7,7,8-pentachloro-3-oxatricyclo [4.2.1.0$^{4,8}$]nonane (Reaction A)*

A reaction vessel equipped with an agitator and a condenser was charged with 1177 parts of anhydrous etanol. To this alcohol was added portionwise 92 parts of sodium metal. The resulting solution was agitated at reflux and a solution of 361 parts of 1,4,5,6,7,7-hexachloro-2,3-di(hydroxymethyl)bicyclo(2.2.1)-5-heptene in 235 parts of absolute ethanol was added portionwise over two hours. After completion of the addition, the suspension was stirred at reflux for two hours, then brought to a pH of 7.0 with concentrated hydrochloric acid. The suspension was filtered, and the filtrate was stripped of solvent. The residue was washed with water, filtered, dried, and recrystallized from n-hexane to give 240 parts of crystals, having a melting point of 138.5 to 140 degrees centigrade. Another recrystallization raised the melting point to 140.5 to 141.5 degrees centigrade. The product analyzed as follows:

Calculated for $C_{11}H_{13}Cl_5O_3$: C, 35.67; H, 3.51; Cl, 47.86.

Found: C, 35.78; H, 3.54; Cl, 47.78.

Calculated hydroxyl No.: 151. Found: 149.

EXAMPLE 3

*Preparation of 4 - ethoxy-5,6,7,7,8-pentachloro-3-oxatricyclo-[4.2.1.0$^{4,8}$]nonane (Reaction A)*

A solution of sodium ethoxide was prepared by adding 92 parts of sodium metal to 3925 parts of absolute ethanol. To this solution was added, with stirring at 74 degrees centigrade, a solution of 331 parts of 1,4,5,6,7,7-hexachloro - 2-hydroxymethylbicyclo(2.2.1)-5-heptene in 785 parts of absolute ethanol. Addition was made portionwise over one hour. The suspension was stirred at reflux for two hours after addition of the reactants was completed. 4000 parts of water were added to the reaction at completion, and the pH was adjusted with hydrocloric acid to 7.0. The solid that precipitated was collected on a filter, washed several times with water and dried under vacuum at 50 degrees centigrade overnight to a constant weight of 332 parts. Recrystallization from n-heptane and a treatment with activated charcoal yielded 325 parts of product, having a melting point of 110 to 111.5 degrees centigrade. Product analysis was:

Calculated for $C_{10}H_{11}O_2Cl_5$: Cl, 52.1; C, 35.3; H, 3.24.

Found: Cl, 52.0; C, 35.4; H, 3.36.

EXAMPLE 4

*Preparation of 7,7 - dimethoxy - 4-ethoxy-5,6,8-trichlorocyclo-[4.2.1.0$^{4,8}$]nonane (Reaction A)*

To 118 parts of anhydrous ethanol were added 10.2 parts of metallic sodium. This solution was warmed to reflux with agitation, and a solution of 32.2 parts of 1,4,5,6 - tetrachloro - 2-hydroxymethyl-7,7-dimethoxybicyclo(2.2.1)-5-heptene was added over a period of 0.75 hour. The suspension has stirred for three hours at reflux, then filtered and the solvent was stripped. The residue was treated with excess water, and the resulting suspension was acidified with hydrochloric acid. The resulting oil solidified and was recrystallized from about 96 parts by weight of petroleum ether immersed in a Dry Ice-acetone cooling bath. The white solid product weighing 24.0 parts had a melting point of 62 to 68 degrees centigrade and was recrystallized to yield 20.0 parts by weight of product having a melting point of 68.5 to 69.5 degrees centigrade. Analysis of the product showed:

Calculated for $C_{12}H_{17}Cl_3O_4$: C, 44.10; H, 5.24; Cl, 32.3.

Found: C, 43.60; H, 5.14; Cl, 32.19.

Using the same procedure, the compounds 1,4,5,6-tetrachloro - 2 - hydroxymethyl-7,7-dibromobicyclo(2.2.1) - 5-heptene and 1,4,5,6 - tetrachloro-2-hydroxymethyl-7,7-difluorobicyclo(2.2.1)-5-heptene are reacted to produce 7,7 - dibromo - 4 - ethoxy - 5,6,8 - trichloro-3-oxatricyclo [4.2.1.0$^{4,8}$]nonane and 7,7 - difluoro - 4-ethoxy-5,6,8-trichloro-3-oxatricyclo-[4.2.1.0$^{4,8}$]nonane, respectively.

EXAMPLE 5

*Preparation of 2-ethoxymethyl-4-methoxy-5,6,7,7,8-pentachloro-3-oxatricyclo[4.2.1.0⁴,⁸]nonane (Reaction A)*

To a solution of sodium ethoxide prepared by adding 9.2 parts of metallic sodium to 196 parts by weight of absolute ethanol was added 34.3 parts by weight of 2-(epoxyethyl) - 1,4,5,6,7,7 - hexachlorobicyclo - (2.2.1)-5-heptene. The solution was heated to reflux with stirring for nine hours, cooled to room temperature, acidified with dilute hydrochloric acid and filtered. The filtrate was stripped of solvent and the residue taken up in 71 parts by weight of diethyl ether. The ether solution was washed with 50 parts by weight of water, then dried over anhydrous magnesium sulfate. After filtration and removal of the ether by evaporation, the oil residue of 35 parts was subjected to a vacuum distillation to give 28 parts by weight of a pale yellow oil boiling at 150 to 151 degrees centigrade/0.15 mm., and having a refractive index of $n_D^{25}$ 1.5164. The product analyzed as follows:

Calculated for $C_{13}H_{17}O_3Cl_5$: C, 39.20; H, 4.26; Cl, 44.4.

Found: C, 39.30; H, 4.30; Cl, 44.45.

EXAMPLE 6

*Preparation of 4-(2',4'-dichlorophenoxy)-5,6,7,7,8-pentachloro-3-oxatricyclo[4.2.1.0⁴,⁸]nonane (Reaction A)*

A solution of sodium alcoholate, prepared from 9.2 parts of sodium metal and 157 parts of ethanol, was treated with 65.6 parts of 2,4-dichlorophenol. To this solution at reflux, 32.1 parts of 1,4,5,6,7,7-hexachloro-2-hydroxymethylbicyclo(2.2.1)-5-heptene in 78.5 parts by weight of ethanol was added portionwise over 0.5 hour. The suspension was stirred at reflux for 3.0 hours. The reaction mixture was evaporated to one-third of its volume and the residue added to a large excess of water. The oil that separated, crystallized on standing to yield 32 parts of solid which recrystallized from hexane to yield 15 parts of solid product melting at 109 to 129 degrees centigrade. The solid was treated with dilute aqueous caustic, then recrystallized from heptane to yield a solid having a melting point of 136 to 138 degrees centigrade. The product analysis was:

Calculated for $C_{14}H_9Cl_7O_2$: C, 36.76; H, 1.98; Cl, 54.26.

Found: C, 37.00; H, 2.0; Cl, 54.7.

EXAMPLE 7

*Preparation of 4-allyloxy-5,6,7,7,8-pentachloro-3-oxatricyclo[4.2.1.0⁴,⁸]nonane (Reaction A)*

To 212 parts by weight of anhydrous allyl alcohol were added 9.2 parts of metallic sodium. To this solution heated to 100 degrees centigrade was added portionwise a solution of 33.1 parts of 1,4,5,6,7,7-hexachloro-2-hydroxymethylbicyclo(2.2.1)-5-heptene over a period of 2.0 hours. The suspension was stirred at reflux for an additional 4.0 hours, then filtered while still hot. The alcohol solution was acidified with hydrochloric acid and then subjected to vacuum stripping. The residue was diluted with excess water and 28.0 parts of brown solid were collected on a filter. Recrystallization of the product from heptane treated with activated charcoal gave 22 parts by weight of white crystalline solid having a melting point of 48 to 49 degrees centigrade. The product analyzed as follows:

Calculated for $C_{11}H_{11}Cl_5O_2$: C, 37.48; H, 3.15; Cl, 50.3.

Found: C, 37.25; H, 3.09; Cl, 50.4.

EXAMPLE 8

*Preparation of 9-carboxy-4-methoxy-5,6,7,7,8-pentachloro-3-oxatricyclo[4.2.1.0⁴,⁸]nonane (Reaction A)*

50 parts by weight of 2,3-di(hydroxymethyl)-1,4,5,6,7,7-hexachlorobicyclo(2.2.1)-5-heptene were mixed with 300 parts of concentrated nitric acid and heated at the reflux temperature with stirring for 22 hours. Thereafter, the reaction mixture was poured into cold water and a white solid product precipitated. The product was recrystallized from a benzene-heptene mixture. The resulting bicyclic lactone (43 parts) had a melting point of 254 to 260 degrees centigrade and a chlorine content of 59.4 percent. The calculated chlorine content of the bicyclic lactone is 60.5 percent. Then 17.8 parts of the crude lactone were added to a solution of freshly prepared sodium methoxide (prepared by dissolving 5.75 parts by weight of metallic sodium in 150 cubic centimeters of methyl alcohol). The mixture was refluxed for three hours, after which the methyl alcohol was stripped from the reaction mixture. The residue was treated with water and acidified to provide 15 parts of a brown oil which crystallized on standing. The product was recrystallized from benzene and treated with activated charcoal. The resulting purified product had a melting point of 179 to 182 degrees centigrade. Infrared analysis indicated the disappearance of the unsaturation from the bicyclic lactone, and that the compound had a free carboxyl group.

EXAMPLE 9

*Preparation of 4-ethylmercapto-5,6,7,7,8-petnachloro-3-oxatricyclo[4.2.1.0⁴,⁸]nonane (Reaction A)*

Into 78.5 parts by weight of ethanol were slowly mixed 4.6 parts of sodium metal in a reaction vessel. Then 12.4 parts of ethyl mercaptan were added to the vessel, and thereafter 16.5 parts of 1,4,5,6,7,7-hexachloro-2-hydroxymethylbicyclo(2.2.1)-5-heptene dissolved in 78.5 parts by weight of ethanol were added over a period of ten minutes at 69 degrees centigrade. The reaction mixture was refluxed at 80 degrees centigrade for two hours. Then the reaction mixture was cooled, water was added, and the product was acidified with hydrochloric acid to neutralize it. The resulting mixture was extracted three times with diethyl ether, and was distilled to remove the solvent. The resulting brown oil product (17.8 parts by weight) was fractionated. The fraction boiling at 138 to 144 degrees centigrade and 0.2 mm. was a yellow oil (8 parts) having the following analysis:

Calculated for $C_{10}H_{11}Cl_5SO$: C, 33.69; H, 3.11; Cl, 49.8; S, 8.98.

Found: C, 33.61; H, 3.05; Cl, 49.9; S, 9.13.

EXAMPLE 10

*Preparation of 4-hydroxyethoxy-5,6,7,7,8-pentachloro-3-oxatricyclo[4.2.1.0⁴,⁸]nonane (Reaction A)*

To 1110 parts by weight of ethylene glycol were added 46 parts of sodium metal at 50 to 75 degrees centigrade over a period of two to three hours. Then, 165.5 parts of 1,4,5,6,7,7 - hexachloro - 2-hydroxymethylbicyclo(2.2.1)-5-heptene dissolved in 555 parts by weight of ethylene glycol were slowly added with agitation to the sodium glycolate in a reaction vessel at 65 to 70 degrees centigrade in one hour. The reaction mixture was elevated to a temperature of 100 degrees centigrade, which temperature was maintained for five hours. Then 192.4 parts by weight of concentrated hydrochloric acid were added to the reaction mixture at 40 degrees centigrade to neutralize the reaction product. Thereafter, 2500 parts by weight of water were added to the reaction product, and the resulting suspension was extracted five times with carbon tetrachloride. The carbon tetrachloride was evaporated from the extract, and the resulting oil product crystallized. Infrared analysis of the product indicate the presence of a strong hydroxyl band, strong ether bands and no unsaturation in the product. The chlorine analysis of the product was found to be 49.1 percent (calculated value for $C_{10}H_{11}Cl_5O_3$ is 49.8 percent).

EXAMPLE 11

*Preparation of 9-chloromethyl-4-ethoxy-5,6,7,7,8-pentachloro-3-oxatricyclo[4.2.1.0⁴,⁸]nonane*

A mixture of 37 parts of 4-ethoxy-9-hydroxymethyl-5,6,7,7,8-pentachloro-3-oxatricyclo[4.2.1.0⁴,⁸]nonane with phosphorus pentachloride was slowly heated to 45 to 55 degrees centigrade at which point an exothermic reaction commenced. After ten minutes, complete solution resulted and the pot temperature had risen to 150 degrees centigrade with refluxing observed. Heating was continued until hydrogen chloride evolution had virtually ceased, which required six hours. The reaction mixture was cooled and poured into ice. The oily solid product resulting was triturated with water, then taken up in n-hexane. After washing the resulting hexane solution with water, drying over $CaSO_4$, filtering and cooling to $-15$ degrees centigrade, the hexane solution gave 13.3 parts of solid product having a melting point of 86.5 to 87.5 degrees centigrade. Infrared analysis of the product showed the product was not unsaturated and contained no carbonyl or hydroxyl groups. Chemical analysis of the product showed:

Calculated for $C_{11}H_{12}O_2Cl_6$: Cl, 54.7; C, 33.97. H, 3.11. Found: Cl, 55.1; C, 34.16; H, 2.93.

EXAMPLE 12

*Preparation of 4,5,6,7,7,8-hexachloro-3-oxatricyclo [4.2.1.0$^{4,8}$]nonane (Reaction B)*

10 parts of 4-methoxy-5,6,7,7,8-pentachloro-3-oxatricyclo[4.2.1.0$^{4,8}$]nonane were mixed with 158.4 parts by weight of carbon tetrachloride. Gaseous chlorine was introduced into the reaction mixture in the presence of a mercury vapor light at a temperature of 78 to 80 degrees centigrade for 0.66 hour. When 34 milliequivalents of chloride ion had been collected overhead from the reaction mixture, a sample of the product was removed from the reactor, the solvent was evaporated and the resulting colorless syrup was found to have a chlorine content of 58.4 percent. The remainder of the reaction mixture was chlorinated further until 0.0145 mole of chlorine ion had been added. The resulting product was evaporated to remove the solvent, thus producing a light brown cloudy syrup. Infrared analysis showed that the product was free of carbonyl group. The product contained 68.5 percent chlorine. The chlorine content of the desired product is calculated to be 68.4 percent.

EXAMPLE 13

*Preparation of 4 - hydroxy - 9 - hydroxymethyl - 5,6,7,7,8-pentachloro-3-oxatricyclo[4.2.1.0$^{4,8}$]nonane (Reaction C)*

A suspension of 221 parts by weight of concentrated sulfuric acid and 24 parts of 4-ethoxy-9-hydroxymethyl-5,6,7,7,8-pentachloro-3 - oxatricyclo[4.2.1.0$^{4,8}$]nonane with concentrated sulfuric acid was stirred with heating to 90 to 92 degrees centigrade and held at this temperature for eight minutes. The resulting solution was poured into ice and the solid collected on a filter. After a thorough washing with water, 15 parts of solid product were recrystallized three times from methanol and water to yield 10.8 parts of solid product having a melting point of 236 to 238 degrees centigrade. Infrared analysis showed the presence of the carbonyl and hydroxyl groups. Elemental analysis of the product showed:

Calculated for $C_9H_9Cl_5O_3$: C, 31.58; H, 2.63; Cl, 52.2. Found: C, 31.81; H, 2.61; Cl, 52.0.

EXAMPLE 14

*Preparation of 4-hydroxy-5,6,7,7,8-pentachloro-3-oxatricyclo[4.2.1.0$^{4,8}$]nonane (Reaction C)*

A suspension of 30 parts of 4-ethoxy-5,6,7,7,8-pentachloro-3-oxatricyclo[4.2.1.0$^{4,8}$]nonane in 92 parts by weight of concentrated sulfuric acid was warmed to 88 to 100 degrees centigrade with stirring and was held for 0.75 hour. The hot acid solution was poured into 700 parts of ice and water, and the resulting suspension was warmed to 80 degrees centigrade, then cooled and filtered. Then 13 parts of solid product were recrystallized from benzene several times to yield 7 parts of white crystals having a melting point of 231 to 232 degrees centigrade. Infrared analysis of the product indicated the presence of hydroxyl group, absence of carbonyl group. Elemental analysis showed:

Calculated for $C_8H_7Cl_5O_2$: C, 30.75; H, 2.24; Cl, 56.70. Found: C, 30.96; H, 2.20; Cl, 56.90.

EXAMPLE 15

*Preparation of 9-chloromethyl-4-hydroxy-5,6,7,7,8-pentachloro-3-oxatricyclo[4.2.1.0$^{4,8}$]nonane (Reaction C)*

25 parts of 4-ethoxy-9-chloromethyl-5,6,7,7,8-pentachloro-3-oxatricyclo[4.2.1.0$^{4,8}$]nonane were added to 110 parts by weight of concentrated sulfuric acid over a period of 15 minutes while stirring the mixture. The resulting suspension was heated to 94 degrees centigrade and held at that temperature for 20 minutes, and was then cooled by pouring onto ice. 23 parts of a white solid product were isolated from the reaction mixture. The product was recrystallized from benzene and 17 parts of product were recovered having a melting point of 144.5 to 146 degrees centigrade. Elemental analysis of the compound gave the following results:

Calculated for $C_9H_8Cl_6O_2$: C, 29.95; H, 2.23; Cl, 58.94. Found: C, 30.18; H, 2.23; Cl, 58.5.

EXAMPLE 16

*Preparation of 2-keto - 5,6 - bis(chloromethyl) - 1,3,4,7,7-pentachloro-bicyclo(2.2.1)heptane (Reaction D)*

A mixture of 100 parts of 9-chloromethyl-4-hydroxy-5,6,7,7,8-pentachloro-3-oxatricyclo[4.2.1.0$^{4,8}$]nonane and 74 parts of phosphorus pentachloride was heated slowly to the reflux temperature. An exothermic reaction took place, accompanied by evolution of hydrogen fluoride. The reaction mixture was refluxed at 136 degrees centigrade for 1.5 hours. The resulting reaction product was poured into water and washed thoroughly and then extracted with hexane. The reaction product was dried in contact with magnesium sulfate and then the hexane solvent was distilled off. The product distilled at a temperature of 140 to 144 degrees centigrade and 1 mm. mercury. Infrared analysis of the product indicated the presence of the carbonyl group. Chemical analysis gave the following results:

Calculated for $C_9H_7Cl_7O$: C, 28.57; H, 1.60; Cl, 65.6. Found: C, 28.32; H, 1.66; Cl, 68.2.

EXAMPLE 17

*Preparation of 2-keto-6-chloromethyl-1,3,4,7,7-pentachloro(2.2.1)heptane (Reaction D)*

A mixture of 187.4 parts of 4-hydroxy-5,6,7,7,8-pentachloro-3-oxatricyclo[4.2.1.0$^{4,8}$]nonane and 146 parts of phosphorus pentachloride was carefully warmed with agitation. At 50 to 55 degrees centigrade, an exothermic reaction took place with vigorous evolution of hydrogen chloride. The pale yellow, resulting solution was stirred at reflux (118–120 degrees centigrade) for two hours, then poured into crushed ice. The white solid obtained was washed several times with water and recrystallized from hexane to yield 110 parts of product having a melting point of 69.5 to 71.5 degrees centigrade. Analysis of the product gave the following results:

Calculated for $C_8H_6Cl_6O$: C, 29.95; H, 1.83; Cl, 64.3. Found: C, 29.23; H, 1.97; Cl, 63.80.

EXAMPLE 18

*Preparation of 4-cyano-5,6,7,7,8-pentachloro-3-oxatricyclo[4.2.1.0$^{4,8}$]nonane (Reaction E)*

A solution containing 132 parts of 2-keto-5,6-bis(chloromethyl) - 1,3,4,7,7 - pentachlorobicyclo(2.2.1)heptane in 785 parts by weight of ethanol and 30 parts by weight of water was treated with 52 parts of potassium cyanide. The solution was stirred at reflux for 2.0 hours. The resulting dark suspension was acidified with dilute sulfuric acid and then evaporated to near dryness. The residue was poured into water and the brown solid collected on a filter. The solid was dissolved in hexane, dried over magnesium sulfate (anhydrous), and filtered. The excess hexane was removed, and crystals separated upon chilling the solution. 60 parts of product were recovered having a melting point of 226 to 231 degrees centigrade. Recrystallization raised the melting point to 235 to 236 degrees centigrade. Elemental analysis of the product gave the following results:

Calculated for $C_9H_6ONCl_5$: C, 33.63; H, 1.88; N, 4.36; Cl, 55.16.

Found: C, 33.7; H, 2.02; N, 4.28; Cl, 54.98.

EXAMPLE 19

*Preparation of 4-carboxy-5,6,7,7,8-pentachloro-3-oxatricyclo-[4.2.1.0$^{4,8}$]nonane (Reaction F)*

To a mixture of 552 parts by weight of sulfuric acid, 100 parts by weight of water and 1050 parts by weight of glacial acetic acid were added 80 parts of 4-cyano-5,6,7,7,8-pentachloro-3-oxatricyclo[4.2.1.0$^{4,8}$]nonane. The mixture was stirred and heated to 127 degrees centigrade at which temperature slight refluxing occurred. Refluxing was continued for 14 hours, and the reaction mixture was added to 5000 parts by weight of water. The solid product was filtered from the mixture, washed with water and dried. The resulting product was 60 parts of white solid having a melting point of 279 to 281 degrees centigrade. The product had a chlorine content of 51.8 percent. The calculated chlorine content for $C_9H_6Cl_5NO$ is 52.1 percent. The acid number of the product corresponded closely to the theoretical value:

Calculated neutralization equivalent: 340.
Found: 339.

EXAMPLE 20

*Preparation of 4-methoxy-5,6,7,7,8-pentachloro-3-oxatricyclo-[4.2.1.0$^{4,8}$]nonane (Reaction G)*

Over a period of a few minutes, 100 parts of 2-keto-6-chloromethyl-1,3,4,7,7-pentachlorobicyclo(2.2.1)heptane were added to 1570 parts by weight of a solution prepared by adding 25 parts of sodium to methyl alcohol at reflux. The resulting dark suspension was reflux for 12 hours. Then the excess methanol was distilled from the product under vacuum, and the residue was acidified and filtered. The filter cake was washed with water and 60 parts of solid product were recovered and recrystallized from heptane to provide a product having a melting point of 82 to 85 degrees centigrade. The melting point indicated the product to be the same as that produced using the procedure of Example 3 with methanol as the solvent. The product was also analyzed by infrared analysis, and the resulting spectrum was the same as that of the product produced using the procedure of Example 3 with methanol as the solvent.

EXAMPLE 21

*Preparation of 4-hydroxy-5,6,7,7,8-pentachloro-3-oxatricyclo-[4.2.1.0$^{4,8}$]nonane (Reaction H)*

To a mixture of 84 parts of sodium bicarbonate, 500 parts by weight of water and 3925 parts by weight of ethyl alcohol were added 330 parts of 2-keto-6-chloromethyl-1,3,4,7,7-pentachlorobicyclo(2.2.1)heptane. The mixture was refluxed for 10 hours and then evaporated on a steam cone. Excess water was added to the product, and an oil formed. The oil was treated with hexane. About 25 parts of product that was insoluble in hexane was subjected to infrared analysis and found to have a spectrum identical to that produced in Example 14.

EXAMPLE 22

*Preparation of 9-hydroxymethyl-4-isopropoxy-5,6,7,7,8-pentachloro-3-oxatricyclo[4.2.1.0$^{4,8}$]nonane (Reaction A)*

44 parts of metallic sodium were mixed with 1248 parts of isopropanol and refluxed at 80 to 83 degrees centigrade for 8 hours to prepare sodium isopropoxide. To this reactant were slowly added 180 parts of 1,4,5,6,7,7-hexachloro-2,3-di(hydroxymethyl)bicyclo(2.2.1)-5-heptane, at about 80 degrees centigrade. The reaction mixture was refluxed at about 80 degrees centigrade for three hours. Then about 150 parts of isopropanol was distilled and the resulting solidified product was discharged into water and acidified with 154 parts of concentrated hydrochloric acid. An amber colored oil was recovered. Infrared analysis indicated the absence of the bicyclic alcohol starting material.

EXAMPLES 23 TO 25

*Fungicidal activity.*—Finely divided aqueous dispersions of various compounds of the invention were prepared by dissolving them in a minimum quantity of acetone and pouring the solutions into water with vigorous agitation, to obtain dispersions containing 400 parts of the chemical per million parts of water (i.e. 0.04%). These dispersions were quickly sprayed onto tomato plants which had been inoculated with spores of *Alternaria solani,* the causative organism of early blight disease of tomatoes. Three days later when similarly inoculated but unsprayed plants were severely diseased, as shown by leaf necrosis, the treated plants showed the following degree of disease control:

| Example | Compound | Disease Rating* |
|---|---|---|
| 23 | (structure with $C_2H_5O$-) | 2 |
| 24 | (structure with HO-) | 3 |
| 25 | (structure with chlorophenyl-O-) | 2 |

* Scale:
 0=No control.
 1=Slight control.
 2=Substantial, economically useful control.
 3=Essentially complete control of leaf necrosis.

EXAMPLE 26

*Bacteriostatic activity.*—The incorporation of 255 parts per million of the compound of the formula

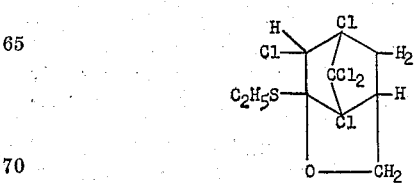

into nutrient agar which was then inoculated with *Staphylococcus aureus,* strongly retarded growth of the bacterial colonies on the agar.

EXAMPLE 27

*Herbicidal activity.*—The application of four pounds per acre of the compound of the formula

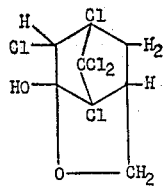

in finely divided form onto a healthy stand of millet resulted in 80 percent kill of the millet within one week.

EXAMPLE 28

*Miticidal activity.*—Bean plants heavily infested with red spider mites were sprayed with an aqueous dispersion of the compound of the formula

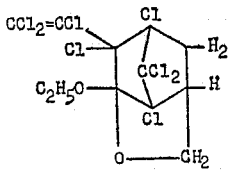

at the rate of 1000 parts of the compound per million parts of water. Within 48 hours, essentially all of the mites were dead.

EXAMPLE 29

*Insecticidal activity.*—The compound of the formula

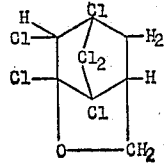

was dispersed in finely divided state in water at concentrations of 500 and 1000 parts of compound per million parts of water. The suspension was sprayed onto the leaves of bean plants. After the water evaporated, the larvae of Southern Army Worm was applied to the leaves. The leaves were observed 24 hours later, and it was found that 100 percent kill had resulted.

EXAMPLE 30

*Plant growth regulation.*—The compound of the formula

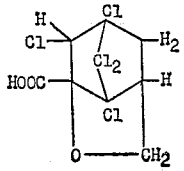

was applied at a rate of 8 pounds of compound per acre to soil in which beans had been planted, but prior to emergence of the bean plants. Another plot of soil in which beans had been planted at the same time as in the test plot was left untreated. After a period of two weeks, the bean plants in the untreated soil had grown to normal size. In contrast, the plants in the test plot were extremely stunted, but no other malformation or toxic effect was observed.

In the foregoing manner, the utility of the compound of the invention was demonstrated as a plant growth regulator. This property is important in the cultivation of ornamental plants, as well as in cultivation of fruit trees where it is desirable to channel the plant growth in the direction of the fruit and retard the tree growth. The cultivation of shorter fruit trees also facilitates the picking of the crop.

In the foregoing examples, the components have been named in accordance with the system of nomenclature employed by Chemical Abstracts, and with the provision that the compounds have the following structural formula

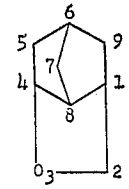

wherein the numerals indicate the position of substituents attached to the tricyclic nucleus. Thus, the compound prepared in Example 2 has been named 4-ethoxy-9-hydroxymethyl-5,6,7,7,8-pentachloro-3 - oxatricyclo[4.2.1.0$^{4,8}$]nonane. Attachment of the oxygen to a different position on the initial bicyclic structure to provide the following structural formula

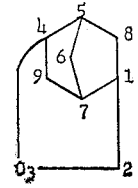

requires renumbering some of the positions of the tricyclic structure, as indicated by the numerals. Under these circumstances, the compound produced in Example 2 is named 4-ethoxy-8-hydroxymethyl-5,6,6,7,9 - pentachloro-3-oxatricyclo[3.2.1$^{4,7}$]nonane.

As shown in the preceding examples, the compounds of the invention are useful in a variety of applications requiring biological activity. Such activity includes utility as fungicides, insecticides, bacteriacides, herbicides, and as plant growth regulators.

When compounds of the invention are utilized in controlling bacteria, the compound is brought into contact with the bacteria to be controlled in an amount sufficient to provide the desired control of the bacteria, e.g., a bacteriacidal amount. Typically, the compound is applied at a rate within the range of about 5 to 25 grams per square meter of the surface to be treated. However, either greater or lesser application rates can be used depending on the conditions that exist and the extent of control required. The compound of the invention can be applied to the area in which bacteria is to be controlled as an aqueous suspension or solution containing the compound in an amount in the range of 5 to about 50 percent by weight of the aqueous composition.

The herbicidal compounds of the invention can be used alone or as part of liquid or solid formulations of various types. Thus, the compounds can be formulated as liquids by diluting, dispersing, dissolving or emulsifying with a surface active adjuvant in organic solvents such as petroleum hydrocarbons, alcohols, ketones, esters, and the like. The compounds can be made into solid formulations of powders, dusts, wettable dusts, granules and pellets, using solid diluents such as talc, clay, flour, starch, mica, limes, carbonates and phosphates. Generally, the proportions of either the solvent medium or solid carrier to herbicidally active material is in the range of 1:1 to 1000:1, preferably 3:1 to 200:1. Rates of application vary according to the degrees of resistance of the plants to be controlled, the soil type and climatic conditions, but in general, the rates of application are at least one quarter of a pound of herbicides per acre up to 400 pounds per acre, preferably 0.5 to 50 pounds per acre, but in any event, in an amount sufficient to provide the desired control, e.g., a herbicidal amount.

When desired for plant growth regulation, the compounds of the invention are similarly formulated as liquid or solid formulations. However, the compounds are used in an amount to provide the desired amount of growth regulation.

When compounds of the invention are utilized in the control of insects and other invertibrate pests, including mites, and many others, the compound is brought into contact with the pest to be controlled in an amount sufficient to provide the desired control, e.g., a pesticidal amount, or an insecticidal amount, and the like. Effective insecticidal concentrations are in the range from about 0.01 pound per acre to about 20 pounds per acre. In most crop applications, rates of 0.05 to 5 pounds per acre are employed. Lower rates are used on very susceptible species, while higher rates are used on extremely resistant species. The insecticidal compounds can be used in combination with a class of potentiators or synergists known in the insecticidal art as "knockdown agents." Other adjuvants useful with the compounds of the invention include odorants, colorants, stabilizers, and extending agents. The composition can be formulated as solids or liquids using solid or liquid solvent vehicles, carriers or extenders. The compounds can also be combined with other pesticidally active compounds.

When compounds of the invention are applied as fungicides, the compound is employed in an amount sufficient to provide the desired control of the fungus, e.g., a fungicidal amount. The compounds are generally used at rates ranging from 0.05 to 100 pounds per acre. Very low rates, 0.05 to 1 pound per acre is sufficient when the compounds are utilized as seed treatment chemicals. Higher rates, 0.1 to 20 pounds per acre are used when a crop is treated in the field, such as in the application of sprays, dusts and granules. Rates up to 100 pounds per acre are utilized when it is necessary to treat an entire mass of soil to a considerable depth in heavily infested fields.

The compounds can be used with other active agents such as insecticides, herbicides, fertilizers, plant growth regulators, and other fungicides. The compounds can be used in the pure state or with suitable adjuvants, such as solvents, solid carriers, surfactants, synergists, colorants and odorants.

While this invention has been described with reference to certain specific embodiments, it will be recognized by those skilled in the art that many variations are possible without departing from the spirit and scope of the invention.

What is claimed is:

1. A compound having the formula:

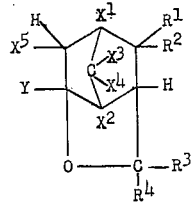

wherein $X^1$ and $X^2$ are independently selected from the group consisting of hydrogen, halogen, alkyl, alkenyl, halogenated alkyl and halogenated alkenyl;

$X^3$ and $X^4$ are independently selected from the group consisting of hydrogen, halogen, alkoxy, alkyl, alkenyl, halogenated alkyl, and halogenated alkenyl, at least two of $X^1$, $X^2$, $X^3$ and $X^4$ being halogen;

$X^5$ is selected from the group consisting of hydrogen, halogen and alkoxy;

Y is a nucleophilic radical;

$R^1$ and $R^2$ are independently selected from the group consisting of hydrogen, hydrocarbyl, halogen-substituted hydrocarbyl, and carboxy;

$R^3$ and $R^4$ are independently selected from the group consisting of hydrogen, hydrocarbyl, halogen-substituted hydrocarbyl, hydroxy-substituted alkyl, alkoxy-substituted alkyl, and hydroxy-substituted alkoxyalkyl; and $R^1$ and $R^3$ are cycloalkyl when $R^1$ and $R^3$ join to form a ring; provided that at least one of $R^1$ and $R^2$ can be hydroxy-substituted alkyl when Y is one of halogen, hydroxy, hydrocarbyloxy, mercapto, substituted hydrocarbyloxy and substituted hydrocarbylmercapto; wherein alkyl has 1 to 18 carbon atoms, alkenyl has 1 to 18 carbon atoms, alkoxy has 1 to 18 carbon atoms, hydrocarbyl has 1 to 18 carbon atoms, cycloalkyl has 3 to 12 carbon atoms, hydrocarbyloxy has 1 to 18 carbon atoms, hydrocarbylmercapto has 1 to 18 carbon atoms and hydrocarbylthio has 1 to 18 carbon atoms.

2. A compound having the formula:

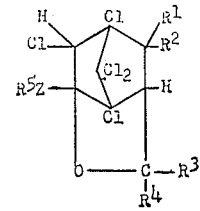

wherein

Z is selected from the group consisting of oxygen and sulfur;

$R^1$ and $R^2$ are independently selected from the group consisting of hydrogen, hydrocarbyl, halogen-substituted hydrocarbyl, hydroxyl-substituted alkyl, and carboxy;

$R^3$ and $R^4$ are independently selected from the group consisting of hydrogen, hydrocarbyl, halogen-substituted hydrocarbyl, hydroxy-substituted alkyl, alkoxy-substituted alkyl, and hydroxy-substituted alkoxyalkyl;

$R^1$ and $R^3$ are cycloalkyl when $R^1$ and $R^3$ join to form a ring; and $R^5$ is selected from the group consisting of hydrocarbyl, halogen-substituted hydrocarbyl, hydroxy-substituted hydrocarbyl, mercapto-substituted hydrocarbyl, hydrocarbyloxy-substituted hydrocarbyl, and hydrocarbylthio-substituted hydrocarbyl; wherein alkyl has 1 to 18 carbon atoms, alkoxy has 1 to 18 carbon atoms, hydrocarbyl has 1 to 18 carbon atoms, cycloalkyl has 3 to 12 carbon atoms, hydrocarbyloxy has 1 to 18 carbon atoms and hydrocarbylthio has 1 to 18 carbon atoms.

3. A compound having the formula:

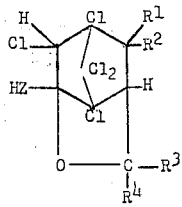

wherein

Z is selected from the group consisting of oxygen and sulfur;

$R^1$ and $R^2$ are independently selected from the group consisting of hydrogen, hydrocarbyl, halogen-substituted hydrocarbyl, hydroxyl-substituted alkyl, and carboxy;

$R^3$ and $R^4$ are independently selected from the group consisting of hydrogen, hydrocarbyl, halogen-substituted hydrocarbyl, hydroxy-substituted alkyl, alkoxy-substituted alkyl, and hydroxy-substituted alkoxyalkyl; and $R^1$ and $R^3$ are cycloalkyl when $R^1$ and $R^3$ join to form a ring; wherein alkyl has 1 to 18 carbon atoms, alkoxy has 1 to 18 carbon atoms, hydrocarbyl has 1 to 18 carbon atoms and cycloalkyl has 3 to 12 carbon atoms.

4. A compound having the formula:

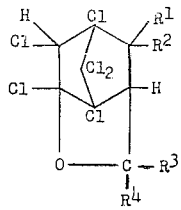

wherein $R^1$ and $R^2$ are independently selected from the group consisting of hydrogen, hydrocarbyl, halogen-substituted hydrocarbyl, hydroxy-substituted alkyl, and carboxy;

$R^3$ and $R^4$ are independently selected from the group consisting of hydrogen, hydrocarbyl, halogen-substituted hydrocarbyl, hydroxy-substituted alkyl, alkoxy-substituted alkyl, and hydroxy-substituted alkoxyalkyl; and $R^1$ and $R^3$ are cycloalkyl when $R^1$ and $R^3$ join to form a ring; wherein alkyl has 1 to 18 carbon atoms, alkoxy has 1 to 18 carbon atoms, hydrocarbyl has 1 to 18 carbon atoms and cycloalkyl has 3 to 12 carbon atoms.

5. A compound having the formula:

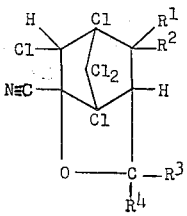

wherein $R^1$ and $R^2$ are independently selected from the group consisting of hydrogen, hydrocarbyl, halogen-substituted hydrocarbyl, and carboxy;

$R^3$ and $R^4$ are independently selected from the group consisting of hydrogen, hydrocarbyl, halogen-substituted hydrocarbyl, hydroxy-substituted alkyl, alkoxy-substituted alkyl, and hydroxy-substituted alkoxyalkyl; and $R^1$ and $R^3$ are cycloalkyl when $R^1$ and $R^3$ join to form a ring; wherein alkyl has 1 to 18 carbon atoms, alkoxy has 1 to 18 carbon atoms, hydrocarbyl has 1 to 18 carbon atoms and cycloalkyl has 3 to 12 carbon atoms.

6. A compound having the formula:

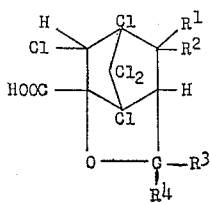

wherein $R^1$ and $R^2$ are independently selected from the group consisting of hydrogen, hydrocarbyl, halogen-substituted hydrocarbyl, and carboxy;

$R^3$ and $R^4$ are independently selected from the group consisting of hydrogen, hydrocarbyl, halogen-substituted hydrocarbyl, hydroxy-substituted alkyl, alkoxy-substituted alkyl, and hydroxy-substituted alkoxyalkyl; and $R^1$ and $R^3$ are cycloalkyl when $R^1$ and $R^3$ join to form a ring; wherein alkyl has 1 to 18 carbon atoms, alkoxy has 1 to 18 carbon atoms, hydrocarbyl has 1 to 18 carbon atoms and cycloalkyl has 3 to 12 carbon atoms.

7. 4-ethylmercapto-5,6,7,7,8-pentachloro-3-oxatricyclo[4.2.1.0$^{4,8}$]nonane.

8. 4,5,6,7,7,8-hexachloro-3-oxatricyclo[4.2.1.0$^{4,8}$]nonane.

9. 4-hydroxy-5,6,7,7,8-pentachloro-3-oxatricyclo[4.2.1.0$^{4,8}$]nonane.

10. 4-carboxy-5,6,7,7,8-pentachloro-3-oxatricyclo[4.2.1.0$^{4,8}$]nonane.

11. 4-(2',4'-dichlorophenoxy)-5,6,7,7,8-pentachloro-3-oxatricyclo[4.2.1.0$^{4,8}$]nonane.

12. A process for preparing a compound of the formula:

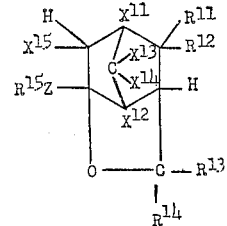

wherein $X^{11}$ and $X^{12}$ are independently selected from the group consisting of hydrogen, halogen, alkyl and alkenyl;

$X^{13}$ and $X^{14}$ are independently selected from the group consisting of hydrogen, halogen, alkoxy, alkyl, and alkenyl, at least two of $X^{11}$, $X^{12}$, $X^{13}$ and $X^{14}$ being halogen;

$X^{15}$ is selected from the group consisting of hydrogen, halogen, and alkoxy;

$R^{11}$ and $R^{12}$ are independently selected from the group consisting of hydrogen, hydrocarbyl, and hydroxy-substituted alkyl;

$R^{13}$ and $R^{14}$ are independently selected from the group consisting of hydrogen, hydrocarbyl, hydroxy-substituted alkyl, alkoxy-substituted alkyl and hydroxy-substituted alkoxyalkyl;

$R^{11}$ and $R^{13}$ are cycloalkyl when $R^{11}$ and $R^{13}$ join to form a ring;

$R^{15}$ is selected from the group consisting of hydrocarbyl, halogen-substituted aryl, hydroxy-substituted hydrocarbyl, mercapto-substituted hydrocarbylthio-substituted hydrocarbyl; and Z is selected from the group consisting of oxygen and sulfur, which comprises reacting a compound of the formula $R^{15}ZH$ wherein $R^{15}$ and Z are as described before, an alkali, and a bicyclic compound of the formula:

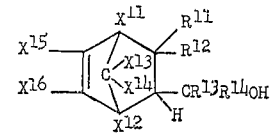

wherein $X^{11}$, $X^{12}$, $X^{13}$, $X^{14}$, $X^{15}$, $R^{11}$, $R^{12}$, $R^{13}$ and $R^{14}$ are as described before; and $X^{16}$ is selected from the group consisting of hydrogen, halogen and alkoxy, at least one of $X^{15}$ and $X^{16}$ being halogen; in which process at least three moles of alkali are employed per mole of bicyclic compound; wherein alkyl has 1 to 18 carbon atoms, alkenyl has 1 to 18 carbon atoms, alkoxy has 1 to 18 carbon atoms, hydrocarbyl has 1 to 18 carbon atoms, cycloalkyl has 3 to 12 carbon atoms and hydrocarbylthio has 1 to 18 carbon atoms.

13. A process for preparing a compound of the formula:

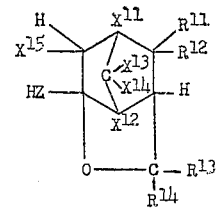

wherein $X^{11}$ and $X^{12}$ are independently selected from the group consisting of hydrogen, halogen, alkyl and alkenyl;

$X^{13}$ and $X^{14}$ are independently selected from the group consisting of hydrogen, halogen, alkoxy, alkyl, and alkenyl, at least two of $X^{11}$, $X^{12}$, $X^{13}$ and $X^{14}$ being halogen;

$X^{15}$ is selected from the group consisting of hydrogen, halogen and alkoxy;

$R^{11}$ and $R^{12}$ are independently selected from the group consisting of hydrogen, hydrocarbyl, and hydroxy-substituted alkyl, and carboxy;

$R^{13}$ and $R^{14}$ are independently selected from the group consisting of hydrogen, hydrocarbyl, hydroxy-substituted alkyl, alkoxy-substituted alkyl and hydroxy-substituted alkoxyalkyl;

$R^{11}$ and $R^{13}$ are cycloalkyl when $R^{11}$ and $R^{13}$ join to form a ring; and Z is selected from the group consisting of oxygen and sulfur; which comprises reacting the product of claim 12 with a mineral acid at a temperature in the range of 50 to 100 degrees centigrade for 10 to 30 minutes; wherein alkyl has 1 to 18 carbon atoms, alkenyl has 1 to 18 carbon atoms, alkoxy has 1 to 18 carbon atoms, hydrocarbyl has 1 to 18 carbon atoms and cycloalkyl has 3 to 12 carbon atoms.

14. A process for preparing a compound of the formula:

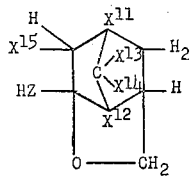

wherein $X^{11}$ and $X^{12}$ are independently selected from the group consisting of hydrogen, halogen, alkyl and alkenyl;

$X^{13}$ and $X^{14}$ are independently selected from the group consisting of hydrogen, halogen, alkoxy, alkyl, and alkenyl, at least two of $X^{11}$, $X^{12}$, $X^{13}$ and $X^{14}$ being halogen;

$X^{15}$ is selected from the group consisting of hydrogen, halogen, and alkoxy; and Z is selected from the group consisting of oxygen and sulfur; which comprises reacting the product of claim 12, wherein $R^{11}$, $R^{12}$, $R^{13}$ and $R^{14}$ are hydrogen, with a mineral acid at a temperature in the range of 50 to 100 degrees centigrade for 10 to 60 minutes; wherein alkyl has 1 to 18 carbon atoms, alkenyl has 1 to 18 carbon atoms and alkoxy has 1 to 18 carbon atoms.

15. A process for preparing a compound of the formula:

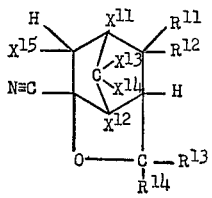

wherein $X^{11}$ and $X^{12}$ are independently selected from the group consisting of hydrogen, halogen, alkyl and alkenyl;

$X^{13}$ and $X^{14}$ are independently selected from the group consisting of hydrogen, halogen, alkoxy, alkyl, and alkenyl, at least two of $X^{11}$, $X^{12}$, $X^{13}$ and $X^{14}$ being halogen;

$X^{15}$ is selected from the group consisting of hydrogen, halogen and alkoxy;

$R^{11}$ and $R^{12}$ are independently selected from the group consisting of hydrogen, hydrocarbyl, and carboxy;

$R^{13}$ and $R^{14}$ are independently selected from the group consisting of hydrogen, hydrocarbyl, hydroxy-substituted alkyl, alkoxy-substituted alkyl and hydroxy-substituted alkoxyalkyl; and $R^{11}$ and $R^{13}$ are cycloalkyl when $R^{11}$ and $R^{13}$ join to form a ring; which comprises reacting an alkali metal cyanide with a compound of the formula:

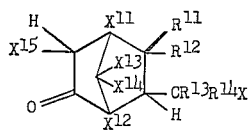

wherein $X^{11}$, $X^{12}$, $X^{13}$, $X^{14}$, $X^{15}$, $R^{11}$, $R^{12}$, $R^{13}$, $R^{14}$ are as defined before, and X is halogen; wherein alkyl has 1 to 18 carbon atoms, alkenyl has 1 to 18 carbon atoms, alkoxy has 1 to 18 carbon atoms, hydrocarbyl has 1 to 18 carbon atoms and cycloalkyl has 3 to 12 carbon atoms.

16. A process for preparing a compound of the formula:

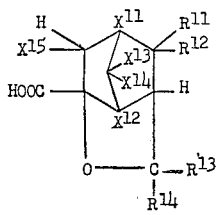

wherein $X^{11}$ and $X^{12}$ are independently selected from the group consisting of hydrogen, halogen, alkyl and alkenyl;

$X^{13}$ and $X^{14}$ are independently selected from the group consisting of hydrogen, halogen, alkoxy, alkyl, and alkenyl, at least two of $X^{11}$, $X^{12}$, $X^{13}$ and $X^{14}$ being halogen;

$X^{15}$ is selected from the group consisting of hydrogen, halogen and alkoxy;

$R^{11}$ and $R^{12}$ are independently selected from the group consisting of hydrogen, hydrocarbyl, and carboxy;

$R^{13}$ and $R^{14}$ are independently selected from the group consisting of hydrogen, hydrocarbyl, hydroxy-substituted alkyl, alkoxy-substituted alkyl and hydroxy-substituted alkoxyalkyl; and $R^{11}$ and $R^{13}$ are cycloalkyl when $R^{11}$ and $R^{13}$ join to form a ring; which comprises reacting the product of claim 15 with a strong acid at an elevated temperature; wherein alkyl has 1 to 18 carbon atoms, alkenyl has 1 to 18 carbon atoms, alkoxy has 1 to 18 carbon atoms, hydrocarbyl has 1 to 18 carbon atoms and cycloalkyl has 3 to 12 carbon atoms.

References Cited
UNITED STATES PATENTS

| | | | |
|---|---|---|---|
| 2,994,637 | 8/1961 | Blimber | 167—33 |
| 3,005,750 | 10/1961 | Fluck et al. | 167—33 |
| 3,163,660 | 12/1964 | Strohmeyer et al. | 260—346.1 |
| 3,165,636 | 1/1965 | Strohmeyer et al. | 260—346.1 |

OTHER REFERENCES

Fieser: Organic Chemistry, p. 32, 2d ed. (1950).

NICHOLAS S. RIZZO, *Primary Examiner.*

HENRY R. JILES, *Examiner.*